United States Patent
Tenzer et al.

(10) Patent No.: US 10,454,105 B2
(45) Date of Patent: Oct. 22, 2019

(54) ELECTRODE FOR AN ENERGY ACCUMULATOR AND MANUFACTURING METHOD

(71) Applicant: Robert Bosch GmbH, Stuttgart (DE)

(72) Inventors: Martin Tenzer, Nuertingen (DE); Thomas Wöhrle, München (DE); Calin Iulius Wurm, Meitingen (RO)

(73) Assignee: Robert Bosch GmbH, Stuttgart (DE)

( * ) Notice: Subject to any disclaimer, the term of this patent is extended or adjusted under 35 U.S.C. 154(b) by 867 days.

(21) Appl. No.: 14/829,223

(22) Filed: Aug. 18, 2015

(65) Prior Publication Data

US 2016/0056456 A1 Feb. 25, 2016

(30) Foreign Application Priority Data

Aug. 19, 2014 (DE) .................. 10 2014 216 423

(51) Int. Cl.
| | |
|---|---|
| *H01M 4/38* | (2006.01) |
| *H01M 4/04* | (2006.01) |
| *H01M 4/13* | (2010.01) |
| *H01M 4/139* | (2010.01) |
| *H01M 4/36* | (2006.01) |
| *H01M 4/62* | (2006.01) |
| *H01M 10/0525* | (2010.01) |

(52) U.S. Cl.
CPC ......... *H01M 4/382* (2013.01); *H01M 4/0402* (2013.01); *H01M 4/0421* (2013.01); *H01M 4/0423* (2013.01); *H01M 4/0428* (2013.01); *H01M 4/13* (2013.01); *H01M 4/139* (2013.01); *H01M 4/366* (2013.01); *H01M 4/62* (2013.01); *H01M 10/0525* (2013.01)

(58) Field of Classification Search
CPC ..................................................... H01M 4/366
See application file for complete search history.

(56) References Cited

U.S. PATENT DOCUMENTS

| | | | |
|---|---|---|---|
| 2001/0041294 A1 | 11/2001 | Chu et al. | |
| 2002/0012846 A1 | 1/2002 | Skotheim et al. | |
| 2008/0318133 A1* | 12/2008 | Matsuyama | H01M 4/13 429/300 |
| 2011/0177369 A1 | 7/2011 | Endo et al. | |
| 2013/0003260 A1 | 1/2013 | Kondou et al. | |
| 2013/0095380 A1* | 4/2013 | Affinito | H01M 4/13 429/207 |
| 2013/0136981 A1* | 5/2013 | Peuchert | C03C 12/00 429/188 |

FOREIGN PATENT DOCUMENTS

KR 10-2014-0048010 A 4/2014

* cited by examiner

*Primary Examiner* — Sarah A. Slifka
*Assistant Examiner* — Brian R Ohara
(74) *Attorney, Agent, or Firm* — Maginot, Moore & Beck LLP

(57) ABSTRACT

An electrode for an energy accumulator comprises a substrate, an active anode layer having an active anode material, the active anode material being at least partially a lithium, a lithium alloy and/or a lithium intercalation material, at least one lithium-ion-conducting layer having a material composition which gradually changes over a layer thickness and has at least one lithium-ion-conducting component. A method for forming an electrode for an energy accumulator, and a lithium-ion battery comprising an electrode are also disclosed.

10 Claims, 1 Drawing Sheet

ELECTRODE FOR AN ENERGY ACCUMULATOR AND MANUFACTURING METHOD

This application claims priority under 35 U.S.C. § 119 to patent application no. DE 10 2014 216 423.0, filed on Aug. 19, 2014 in Germany, the disclosure of which is incorporated herein by reference in its entirety.

BACKGROUND

The disclosure relates to an electrode for an energy accumulator, in particular a lithium-based energy accumulator and a method for manufacturing such an electrode. The present disclosure also relates to a lithium-ion battery.

Lithium-ion batteries are known as energy accumulators with a very high energy density for multiple applications. In addition to applications in laptops, smart phones etc. such batteries play a significant role in the electrification of automobiles. However, currently achievable energy contents of the batteries with an acceptable battery weight permit only limited ranges and a restricted service life, expressed in cycles.

Lithium-ion batteries, for example lithium-sulfur batteries, comprise essentially a cathode, an anode, a separator arranged between the cathode and the anode and an ion-conducting electrolyte. Lithium-containing anodes, which, compared to carbon anodes which intercalate lithium have a higher energy density with respect to the weight and the volume and are therefore extremely lightweight, are known from the literature. However, the reactivity of lithium and the associated restricted service life, the formation of dendrites, the electrolyte compatibility, its manufacture and safety problems proved disadvantageous for wide use.

Separation of the lithium anode from the electrolyte is aimed at in order to avoid a reaction with the electrolyte during the recharging, so as to avoid the formation of dendrites and of resistance barrier layers on the anode. The resistance barrier layers give rise to an increase in the internal resistance of the battery and to a worsening performance.

Previously, there were a large number of solutions for protecting the lithium anode, including coating the lithium anode with a protective layer made of polymers, ceramics or glass, wherein the protective layer for the lithium ions is conductive. However, the applied protective layer results in the problem of the ionic conductivity being greatly reduced by the boundary layer resistance between the lithium and the protective layer. In the course of the service life of a correspondingly protected lithium anode, the boundary layer resistance continues to increase, particularly since the sharply formed dividing line between the material of the lithium anode and the protective layer gives rise to worsening adhesion, which has an adverse effect on the ionic conductivity.

US 2002/0012846 provides an overview of known solutions for protecting lithium anodes, including coating the lithium anode with an intermediate layer or protective layer. Furthermore it is disclosed that an anode comprises a substrate and an active anode layer which comprises a reaction product of a lithium metal, which is deposited on the substrate together with one or more reactive gaseous materials. The reactive gaseous materials are selected from carbon dioxide, nitrogen, sulfur dioxide, saturated and unsaturated hydrocarbons. In addition, one or more individual-ion-conducting layers are generated which form, as a boundary surface layer, a protection layer which provides stabilization with respect to the anode. Also, the individual layers form precise dividing lines here.

Although a multiplicity of intermediate layers and/or protective layers for lithium anodes have been proposed previously, there continues to be a need for improved electrodes and simplified methods which permit easier manufacture of corresponding batteries with a long service life, high lithium cycling efficiency and high energy density.

SUMMARY

An electrode is proposed for an energy accumulator, in particular a lithium-based energy accumulator, comprising a substrate and an active anode layer, which has at least partially lithium, a lithium alloy and/or a lithium intercalation material as the active anode material, and at least one lithium-ion-conducting layer, wherein the lithium-ion-conducting layer has a material composition which gradually changes over a layer thickness, wherein the material composition contains at least one lithium-ion-conducting component. In addition, a method for manufacturing such an electrode and a lithium-ion battery which comprises the electrode are proposed.

A lithium-based energy accumulator is understood within the scope of the disclosure to be a battery which is based at least partially on lithium and which uses lithium or lithium ions in the electrochemical process of its charging and discharging cycles. The term battery is to be understood as referring to primary cells and also secondary cells, i.e. in particular rechargeable accumulators. A lithium-based battery accordingly comprises lithium batteries and lithium-ion batteries, wherein lithium batteries usually comprise an anode made of metallic lithium or a metallic lithium alloy. Lithium-ion batteries comprise an anode, for example made of graphite, into which lithium ions can be intercalated, for example a lithium-sulfur battery.

An active anode material, also referred to below as active material, is understood in the sense of the present disclosure to be a material which is subjected to an electrochemical reaction during a charging and/or discharging process of an energy accumulator, wherein the material can contain one component or a composition of a plurality of components. The material is an active material which can, in particular, reversibly intercalate lithium ions or enters into a chemical reaction with lithium.

A lithium-ion-conducting layer is understood within the scope of the present disclosure to be, in particular, a layer which is impermeable to the components of the cathode or of the cathode active material which occur in a lithium-based battery, and to possible reaction products thereof, as well as to the electrolyte, but is capable of transporting lithium ions. Suitable material compositions of the at least one lithium-ion-conducting layer for use in the electrode according to the disclosure contain inorganic, organic and mixed inorganic-organic polymer materials, for example polyethylene oxide and the derivatives thereof, glass-like or amorphous materials, glass-ceramic materials and preferably ceramic materials, for example garnets, sulfidic glasses and/or argyrodites. The at least one lithium-ion-conducting layer can also be referred to as an individual-ion-conducting layer which selectively or exclusively permits singly charged cations to pass. The individual ion conductivity for the respective layer can comprise a wide range, wherein this individual ion conductivity is also related to the layer thickness.

In one embodiment, the material composition of the at least one lithium-ion-conducting layer has a ceramic material, containing one or more components, in particular selected from the group composed of garnets, silicon dioxide ($SiO_2$), aluminum dioxide ($Al_2O_3$), titanium dioxide ($TiO_2$), zirconium dioxide ($ZrO_2$), silica gel, magnesium oxide (MgO), zinc oxide (ZnO), electrically conductive carbon compounds, for example in the form of carbon nanotubes, carbon nanofibers, soots or generally carbons with a small particle size or particles which have very small dimensions in at least one dimension or mixtures of one or more materials. Ceramic components with a garnet-like structure are particularly preferably used as lithium-ion-conducting material. The garnets are orthosilicates of the general composition $A_3B_2 (SiO_4)_3$ where A and B represent cation positions which are co-ordinated eight times or six times. The individual $SiO_4$ tetrahedrons are connected to one another by means of ionic bonds with the interstitial B cations.

The ceramic materials can be easily adapted for the application by means of a suitable synthesis method. Such materials are particularly stable and chemically inert.

In one alternative embodiment, the material composition of the lithium-ion-conducting layer has at least one polymer component, selected from electrically conductive polymers, ion-conducting polymers, sulfonated polymers and hydrocarbon polymers.

The at least one lithium-ion-conducting layer is defined by the fact that the material composition changes gradually. In this context it is understood that the material composition changes gradually, wherein this can involve a continuous change, a step-wise change or generally gradation. A transition occurs from at least one component of the one material, in particular lithium, to at least one component of the other material, in particular a ceramic ion conductor, along the thickness of the at least one lithium-ion-conducting layer. The concentration of the lithium component preferably reduces successively and defines i.e. with a predefined profile, starting from the surface of the active anode material as the layer thickness increases and builds up, while the concentration of the ceramic or polymer component of the lithium-ion-conducting layer increases to the same degree. Ultimately, a protective layer is produced on the surface, said protective layer containing only the ceramic or polymer component, if appropriate along with further components, and being lithium-free and/or free of a lithium alloy. The protective layer which is formed is therefore bound securely to the active material having the lithium, as a result of the intermediate lithium-ion-conducting layer with gradually changing material composition.

The protective layer which is formed in this way, composed of the pure lithium-ion-conducting material, forms a boundary surface layer which has a stabilizing and protective effect with respect to the anode.

In one embodiment the layered structure of a lithium anode, i.e. the layer of an active anode material and a lithium-ion-conducting layer with a gradually changing material composition, is supplemented with at least one further protective layer, forming a third layer, composed of a different individual-ion-conducting material from that of the second layer which is in direct contact with the active material. The further protective layer, the third layer, can also be formed with a gradually changing material composition here. For example, such a multi-layered structure comprises the active material of the lithium anode, a ceramic layer with a gradually changing material composition and at least one further layer, composed of a polymer, possibly also with a gradual transition of concentration from the material of the second layer to the pure material of the further layer.

A suitable material for these further layers should be selected according to their properties with respect to the electrolyte, the lithium-ion conductivity and the generated surface structure, wherein this material does not necessarily have to be compatible with the active anode material.

An external protective layer which is provided on the surface and which is in contact with the electrolyte or a dividing layer of a battery, is defined by the fact that layers lying therebelow are protected, in particular if these layers prove to be unstable with respect to the electrolyte or the components of the battery. In particular, the outermost layer should not be porous, in order to prevent penetration of possibly damaging components. In addition, the material of the outermost protective layer should be compatible with the electrolyte, in particular stabile and preferably insoluble in the electrolyte. Furthermore, the external protective layer should be flexible enough to tolerate the changes in volume which possibly occur in the individual layers of the multi-layer structure during charging and discharging cycles.

The described multi-layered structure of a lithium anode is defined by outstanding properties, wherein each of the layers has the desired properties. Therefore, for example a polymer layer with a very smooth surface can be generated which improves the strength and flexibility of the entire multi-layered structure, wherein defects on the electrode surface are reduced. A fault-free layer or structure prevents an accumulation of components which lead to the formation of dendrites, self-discharging and shortening of the service life.

A method for manufacturing an electrode for an energy accumulator is also disclosed, in particular a lithium-based energy accumulator, wherein a first active anode material, in particular having metallic lithium, a lithium alloy and/or a lithium intercalation material and at least one lithium-ion-conducting component are deposited together on a substrate, wherein at least one lithium-ion-conducting layer with a gradually changing material composition is formed.

By means of embodiments of the method of the present disclosure, it is possible to generate a lithium-ion-conducting layer with a gradually changing material composition, wherein an external layer functions as a protective layer. The lithium-ion-conducting layer with a gradually changing material composition forms a ceramic or polymer protective layer which can be applied easily. The method can be any known physical or chemical vapor deposition method, for example sputtering, electron beam vaporization, vacuum vaporization, chemical vapor deposition, physical vapor deposition and plasma deposition, wherein the deposition of the material layers preferably takes place under vacuum or in an inert atmosphere.

In order to generate the lithium-ion-conducting layer with a gradual transition, joint deposition of active anode material and one or more materials is used, wherein in each case the materials i.e. the active anode material, in particular lithium, and the lithium-ion-conducting material, in particular a ceramic, are made available by separate deposition sources. During the deposition process, a first material, for example lithium, is then fed successively and in a definitely decreasing fashion, while at the same time a second material, for example a ceramic material, is fed successively and in a definitely increasing fashion. Accordingly, during the joint deposition, for example lithium vapor is deposited from a deposition source to form a first layer, in particular the active anode layer, on a substrate, carrier or a base body. The deposition source of the ceramic component, present, for example, as a gaseous material is gradually connected, wherein the quantity of ceramic component increases to the same degree as the quantity of the active material decreases. The term "gaseous material" used herein refers to a material which is present in the form of a gas under the temperature and pressure conditions of the deposition method. A layer which can also be referred to as a transition layer is formed with a gradual concentration profile of the relevant components, i.e. with a material composition which changes gradually.

For example, the ceramic or polymer component is made available by a plasma cannon or an ion cannon. The deposition process can also occur by introducing the gaseous material adjacent to the lithium source in a deposition chamber, for example. It is therefore ensured that the component of the lithium-ion-conducting material, in particular a ceramic or polymer component, is integrated into or onto the deposited lithium in the deposited layer in a concentration which increases over the layer thickness. In a deposition phase, the deposition source of the lithium vapor is completely eliminated with the result that a layer is deposited which has only the lithium-ion-conducting ceramic component or polymer component and is free of active anode material. This layer forms a protective layer such as is known from the prior art.

In one development of the method according to the disclosure, yet further layers can each be deposited with a gradually changing material composition to form a multi-layered electrode. It is therefore possible to provide up to 10 layers, each with a gradual concentration profile, wherein preferably up to 5 layers are provided. In the course of the layered structure, ceramic and polymer layers can alternate and/or different ceramic and/or polymer material compositions alternate.

Furthermore, in a deposition step for generating a layer with a gradual transition from one material to another material, at least one further material or a further component with a correspondingly changing material composition can also be deposited.

The subject matter of the disclosure is also an energy accumulator, in particular a lithium-based energy accumulator, comprising at least one electrode which is embodied as described above. Such an energy accumulator has, in particular, a capacitance which is high and particularly stable over the long term, wherein the protective layer which is formed is securely bound to the active anode material.

The solution proposed according to the disclosure of an electrode for an energy accumulator, in particular a lithium-based energy accumulator, makes available an electrode, in particular a negative electrode, which is improved with respect to the service life and the cycle stability. The component of a material which is deposited at least partially with the lithium of the active anode material to form a lithium-ion-conducting layer constitutes a type of bonding agent between the lithium present in the anode material and a protective layer composed of a pure component, in particular the lithium-ion-conducting component.

The electrode according to the disclosure increases, through good utilization of the active material, the capacitance of an energy accumulator which is equipped with such an electrode. In addition, the capacitance proves particularly durable over many charging and/or discharging cycles. Improved robustness to be able to withstand voltages which occur is achieved.

Such a protected electrode for an energy accumulator having a multi-layered structure prevents, on the one hand, even only small quantities of active material from being lost during the operation, since the intermediate stages of the active anode material which form during the charging and/or discharging process are effectively bound and are prevented from dissolving in the electrolyte, in which case material which is relevant to the capacitance would be lost. This can be achieved, in particular, by means of a suitable selection of the material or of the material composition of the individual lithium-ion-conducting layers, wherein components can be used which can interact in different ways with the individual intermediate stages which are formed.

On the other hand, the protective layer increases the chemical stability of the electrode, in particular with respect to the intermediate products which are formed by decomposition of electrolyte components which starts to occur at a relatively high voltage, and which can initiate a growth of dendrites. Accordingly, secondary reactions at the electrode surface can be avoided or at least reduced. In particular, the multi-layered structure satisfies the requirement both for a low boundary layer resistance and sufficient flexibility, wherein the surface layer should be as smooth as possible in order thereby to be able to effectively exclude undesired species which can lead to the formation of dendrites, self-discharging and ultimately to shortening of the service life.

By means of the method according to the disclosure it is possible to obtain thin layers, wherein, in particular, small layer thicknesses are advantageous for preventing excessive quantities of non-active material, which would ultimately increase the weight of the battery and reduce its energy density.

By means of the method according to the disclosure, a layered structure is generated in which sharp dividing lines between the deposited layers are avoided, wherein, in particular, better adhesion of the individual layers is generated by the gradual transition which is generated.

At least a certain intrinsic conductivity is also advantageously made available at boundary areas, particularly by virtue of the fact that a certain addition of conductive components in the material compositions of the layered structure is brought about.

A lithium-ion battery according to the disclosure is defined by an improved cyclical service life and calendar service life, wherein in addition the safety is improved, inter alia, by virtue of the fact that the growth of dendrites is prevented by the gradually built-up protective layer.

BRIEF DESCRIPTION OF THE DRAWINGS

Exemplary embodiments of the disclosure are illustrated in the drawings and explained in more detail in the following description.

In the drawings.

DETAILED DESCRIPTION

Figure 1:
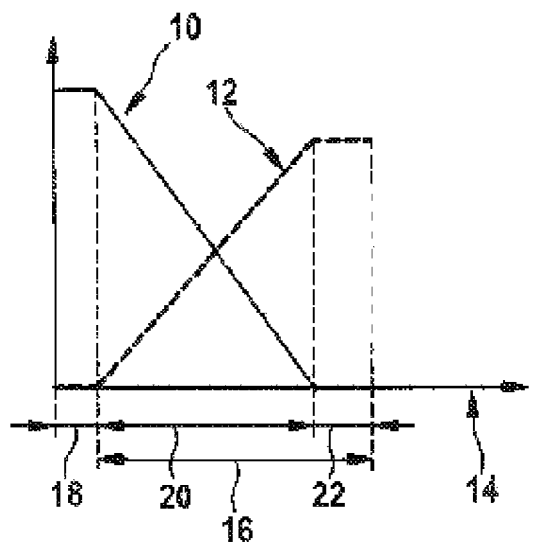
FIG. 1 shows a concentration profile of the lithium component and a concentration profile of the lithium-conducting component over a layer thickness.

FIG. 1 shows a concentration profile 10 of an active anode material and a concentration profile 12 of a lithium-ion-conducting component, containing in a material composition, over a layer thickness 14 of a layered structure to be applied. The layered structure comprises an active anode layer 18 in which largely only active anode material is present. In addition, the layered structure has a lithium-ion-conducting layer 16, wherein as the layer thickness 14 of the applied lithium-ion-conducting layer 16 increases, the proportion or the concentration of the active anode material gradually decreases, as is apparent from the concentration profile 10 of the active anode material, and the proportion or the concentration of the lithium-ion-conducting component in the lithium-ion-conducting layer 16 increases according to the concentration profile 12 illustrated in FIG. 1. This area of the lithium-ion-conducting layer 16 is referred to as a transition layer 20. In a following boundary layer 22, the material composition of the applied lithium-ion-conducting layer 16 is free of active anode material. The concentration profile 10 of the active anode material and the concentration profile 12 of the lithium-ion-conducting component can vary linearly, in a graduated fashion or vary in some other way.

Figure 2:
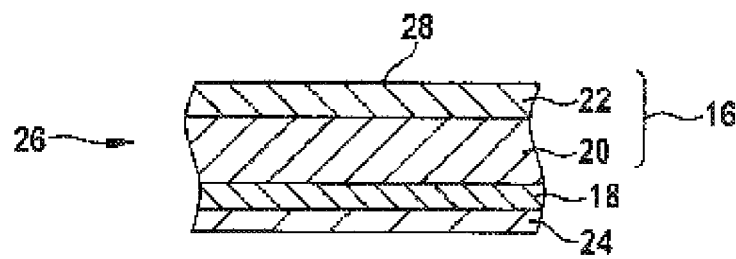
FIG. 2 shows a schematic view of a multi-layered structure of an electrode according to an exemplary embodiment.

FIG. 2 shows a schematic view of a multilayered structure 26 on a substrate 24 of an electrode. Adjacent to the substrate 24, in this sequence, the active anode layer 18 is formed, which contains a high proportion of active anode material, and adjacent thereto the transition layer 20 is formed which is characterized by a changing material composition, in particular the proportion of the active anode material in the material composition decreases gradually along the transition layer 20, while the proportion of the lithium-ion-conducting component increases gradually. In the boundary layer 22, which is an external surface 28 of the multi-layered structure 26, the material composition does not contain any proportion of active anode material and is accordingly free of active anode material.

Figure 3:
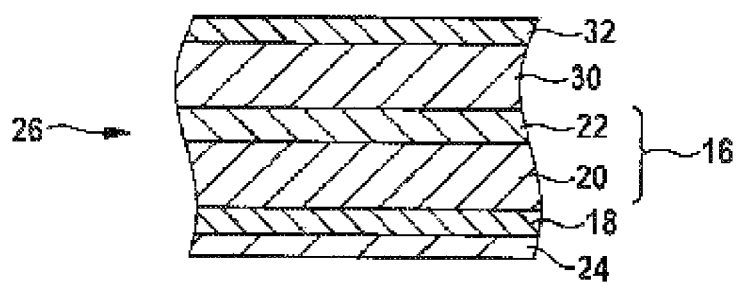
FIG. 3 shows a schematic view of a multi-layered structure of an electrode according to a second exemplary embodiment.

In FIG. 3 a further exemplary embodiment of a multi-layered structure 26 of an electrode is illustrated. The multi-layered structure 26 comprises, in this sequence, in addition to the substrate 24, the active anode layer 18, the transition layer 20 and the boundary layer 22, comprising a first lithium-ion-conducting component, and further layers, in particular an intermediate layer 30 in which a proportion of a further lithium-ion-conducting component changes gradually. In the intermediate layer 30, the proportion of a first lithium-ion-conducting component, containing in the lithium-ion-conducting layer 16, decreases gradually, while the proportion of a second lithium-ion-conducting component containing in the intermediate layer 30 and in a following external layer 32 increases gradually. The external layer 32 is defined by the fact that it is largely free of the first lithium-ion-conducting component.

The invention is not restricted to the embodiments described here or the aspects emphasized therein. Instead, within the range indicated by the claims a large number of refinements are possible which lie within the scope of the activity of a person skilled in the art.

What is claimed is:

1. An electrode for an energy accumulator, comprising,
   a substrate;
   an active anode layer having an active anode material, the active anode material containing at least partially a lithium, a lithium alloy and/or a lithium intercalation material;
   a first lithium-ion-conducting layer which is impermeable to an electrolyte in operable contact with the electrode and which has a first layer thickness, the first lithium-ion-conducting layer having a first material composition containing a first lithium-ion-conducting component which gradually changes over the first layer thickness; and
   a second lithium-ion-conducting layer which is impermeable to the electrolyte in operable contact with the electrode and which has a second layer thickness, the second lithium-ion-conducting layer having the first lithium-ion-conducting component which gradually changes in proportion over the second layer thickness and a second lithium-ion-conducting component which gradually changes in proportion over the second layer thickness inversely to the gradual change of the first lithium-ion-conducting component in the second layer thickness, the second lithium-ion-conducting component different from the first lithium-ion-conducting component.

2. The electrode according to claim 1, the lithium-ion-conducting component of the first lithium-ion-conducting layer comprising a ceramic and/or a polymer component.

3. The electrode according to claim 2, the ceramic component being garnets, argyrodites, glass ceramics and sulfidic glasses.

4. The electrode according to claim 2, the polymer component being polyethylene oxide or derivatives of polyethylene oxide.

5. The electrode according to claim 1, wherein, starting from the active anode layer, a proportion of lithium-ion-conducting component in the first material composition of the one first lithium-ion-conducting layer increases and the proportion of the active anode material in the first material composition of the active anode material decreases as the first layer thickness increases.

6. The electrode according to claim 1, further comprising a boundary layer of the one first lithium-ion-conducting layer that is free of lithium and/or lithium alloy.

7. A method for manufacturing an electrode for an energy accumulator, comprising:
   forming an active anode layer by depositing a first active anode material containing metallic lithium, a lithium alloy and/or a lithium intercalation material on a substrate;
   forming a first lithium-ion-conducting layer, which is impermeable to an electrolyte placed in operable contact with the electrode and which has a first layer thickness, by depositing a first lithium-ion-conducting component on the substrate, the first lithium-ion-conducting layer formed with a first material composition which changes gradually over the first layer thickness; and
   forming a second lithium-ion-conducting layer which is impermeable to the electrolyte in operable contact with the electrode and which has a second layer thickness, the second lithium-ion-conducting layer having the first lithium-ion-conducting component which gradually changes in proportion over the second layer thickness and a second lithium-ion-conducting component which gradually changes in proportion over the second layer thickness inversely to the gradual change of the first lithium-ion-conducting component in the second layer thickness, the second lithium-ion-conducting component different from the first lithium-ion-conducting component.

8. The method according to claim 7, wherein:
   the substrate, the active anode layer, the first lithium-ion-conducting layer, and the second lithium-ion-conducting layer together form a multi-layered structure;
   the first lithium-ion conducting layer further forms a boundary layer; and
   the active anode layer, the first lithium-ion-conducting layer, the second lithium-ion-conducting layer, and the boundary layer are free of active anode material.

9. The method according to claim 8, the active anode layer, the first lithium-ion-conducting layer, and the second lithium-ion-conducing layer are deposited by physical or chemical vapor deposition, the method further comprising:
 providing a deposition source for the active anode material;
 providing one further deposition source for the first material composition of the first lithium-ion-conducting layer, the one further deposition source containing a gaseous material; and
 depositing the first lithium-ion-conducting component of the first material composition with an increasing concentration.

10. A lithium-ion battery, comprising:
 an electrode for an energy accumulator, including (i) a substrate; (ii) an active anode layer containing an active anode material, the active anode material being at least partially a lithium, a lithium alloy and/or a lithium intercalation material; (iii) a first lithium-ion-conducting layer with a first layer thickness which is impermeable to an electrolyte in operable contact with the electrode, the first lithium-ion-conducting layer containing a first material composition which gradually changes over a layer thickness and has a first lithium-ion-conducting component and (iv) a second lithium-ion-conducting layer which is impermeable to the electrolyte in operable contact with the electrode and which has a second layer thickness, the second lithium-ion-conducting layer having the first lithium-ion-conducting component which gradually changes in proportion over the second layer thickness and a second lithium-ion-conducting component which gradually changes in proportion over the second layer thickness inversely to the gradual change of the first lithium-ion-conducting component in the second layer thickness, the second lithium-ion-conducting component different from the first lithium-ion-conducting component.

\* \* \* \* \*

UNITED STATES PATENT AND TRADEMARK OFFICE
CERTIFICATE OF CORRECTION

PATENT NO. : 10,454,105 B2
APPLICATION NO. : 14/829223
DATED : October 22, 2019
INVENTOR(S) : Martin Tenzer, Thomas Wöhrle and Calin Iulius Wurm It is certified that error appears in the above-identified patent and that said Letters Patent is hereby corrected as shown below:

In the Claims

In Claim 5, at Column 8, Line 24, delete the word "one" between the words "the" and "first".

In Claim 6, at Column 8, Line 29, delete the word "one" between the words "the" and "first".

In Claim 8, at Column 8, Line 62, delete the phrase "lithium-ion conducting" and insert the phrase --lithium-ion-conducting-- in its place.

In Claim 9, at Column 9, Line 3, delete the phrase "lithium-ion-conducing" and insert the phrase --lithium-ion-conducting-- in its place.

In Claim 9, at Column 9, Line 7, insert the phrase --at least-- between the words "providing" and "one".

In Claim 9, at Column 9, Line 9, insert the phrase --at least-- between the words "the" and "one".

Signed and Sealed this
Fourth Day of February, 2020

Andrei Iancu
*Director of the United States Patent and Trademark Office*